US012804542B2

(12) United States Patent
Lee

(10) Patent No.: US 12,804,542 B2
(45) Date of Patent: Nov. 17, 2026

(54) METHOD FOR SETTING TARGET WAKE TIME

(71) Applicant: REALTEK SEMICONDUCTOR CORPORATION, Hsinchu (TW)

(72) Inventor: Yi-Chen Lee, Hsinchu (TW)

(73) Assignee: REALTEK SEMICONDUCTOR CORPORATION., Hsinchu (TW)

( * ) Notice: Subject to any disclaimer, the term of this patent is extended or adjusted under 35 U.S.C. 154(b) by 337 days.

(21) Appl. No.: 18/638,304

(22) Filed: Apr. 17, 2024

(65) Prior Publication Data

US 2024/0357490 A1 Oct. 24, 2024

(30) Foreign Application Priority Data

Apr. 21, 2023 (TW) ................................ 112115057

(51) Int. Cl.
*H04W 52/02* (2009.01)

(52) U.S. Cl.
CPC ... *H04W 52/0216* (2013.01); *H04W 52/0219* (2013.01)

(58) Field of Classification Search
CPC . H04W 62/0225; H04W 76/15; H04W 72/20; H04W 56/001; H94W 74/04; H04L 41/0803; H04L 65/60; H04L 1/1657; G06F 3/012
See application file for complete search history.

(56) References Cited

U.S. PATENT DOCUMENTS

| | | | | |
|---|---|---|---|---|
| 11,533,685 B2 | 12/2022 | Nam | | |
| 2022/0131661 A1* | 4/2022 | Nagao | .................. | H04W 84/12 |
| 2023/0108990 A1 | 4/2023 | Asterjadhi | | |
| 2023/0116526 A1* | 4/2023 | Li | .................... | H04W 52/0229 370/311 |

(Continued)

FOREIGN PATENT DOCUMENTS

TW 202116093 A 4/2021

OTHER PUBLICATIONS

IEEE Computer Society, "IEEE Standard for Information Technology Telecommunications and Information Exchange between Systems Local and Metropolitan Area Networks Specific Requirements" 2020, IEEE.

(Continued)

*Primary Examiner* — Iqbal Zaidi
(74) *Attorney, Agent, or Firm* — WPAT, PC

(57) ABSTRACT

A method for setting a target wake time (TWT) includes the following steps: making an access point transmit an extended TWT response frame to N stations during a first TWT service period (SP), wherein the frame carries new TWT parameters and TWT synchronization information; when M station(s) of the N stations receive(s) the extended TWT response frame and (N−M) station(s) of the N stations do(es) not receive the extended TWT response frame, making the M station(s) use the new TWT parameters at a predetermined time point according to the TWT synchronization information and then making the accessing point transmit a next extended TWT response frame to the (N−M) station(s) during a second TWT SP to request the (N−M) station(s) to apply the new TWT parameters at the predetermined time point, wherein the predetermined time point is not earlier than the end of the second TWT SP.

12 Claims, 16 Drawing Sheets

(56) References Cited

U.S. PATENT DOCUMENTS

2023/0373658 A1* 11/2023 Imhoff ................. B64G 1/1007

OTHER PUBLICATIONS

IEEE Computer Society, "IEEE Standard for Information Technology Telecommunications and Information Exchange between Systems Local and Metropolitan Area Networks Specific Requirements" 2021, IEEE.

OA letter of a counterpart TW application (appl. No. 112115057) mailed on Dec. 8, 2023. 5) Summary of the TW OA document issued according to the TW counterpart application: (1) Claim 9 is rejected as being unpatentable over the cited reference 1 (US 2023/0108990 A1) in view of the cited reference 2 (TW 202116093 A, also published as U.S. Appl. No. 11/533,685 B2). P.S. Correspondence between the claims of the TW counterpart application and the claims of the present US.

* cited by examiner

METHOD FOR SETTING TARGET WAKE TIME

BACKGROUND OF THE INVENTION

1. Field of the Invention

The present disclosure relates to a method for setting wireless communication parameters, especially to a method for setting a target wake time (TWT).

2. Description of Related Art

A target wake time (TWT) allows an access point (AP) to manage activities in a Wi-Fi network to reduce the time (i.e., TWT service period (SP)) during which a station (STA) in the Wi-Fi network should stay awake when the STA operates in a power-saving mode, which consequently improves the power consumption performance of the STA.

After the establishment of a TWT agreement between an AP and an STA, if the AP is going to apply new TWT parameters for some application purposes, the AP should transmit a TWT response frame to the STA to inform the STA of the new TWT parameters.

However, when an AP transmit a TWT response frame to multiple STAs to inform them of new TWT parameters, it is likely that only some of the multiple STAs (hereinafter referred to as "first set of STA(s)") successfully receive(s) the TWT response frame while the other STA(s) (hereinafter referred to as "second set of STA(s)") do(es) not successfully receive the TWT response frame due to an insufficient SP caused by channel occupation or due to other interference factors. Afterwards, the first set of STA(s) puts the new TWT parameters into practice immediately while the second set of STA(s) keeps using the original TWT parameters. Accordingly, the beginnings of the TWT SPs for the first set of STA(s) and second set of STA(s) respectively will be different, and this prevents the AP from serving all the multiple STAs simultaneously with Orthogonal Frequency-Division Multiple Access (OFDMA) and leads to inefficiency.

In light of the above, the present technical field looks for a new method capable of assisting all STA(s) in applying new TWT parameters synchronously.

SUMMARY OF THE INVENTION

An object of the present disclosure is to provide a method for setting a target wake time (TWT) to allow all station(s) (STA(s)) to wake up synchronously.

An embodiment of the method of the present disclosure for setting a TWT to allow N STA(s) to wake up synchronously is performed by an access point (AP) and the N STA(s) jointly. This embodiment includes the following steps: making the AP transmit an extended TWT response frame to the N STA(s) during a first TWT service period (SP), wherein the extended TWT response frame carries new TWT parameters and TWT synchronization information; during the first TWT SP, in a first circumstance when M STA(s) of the N STA(s) successfully receive(s) the extended TWT response frame and the other (N−M) STA(s) of the N STA(s) do(es) not successfully receive the extended TWT response frame, making the M STA(s) put the new TWT parameters into practice at a predetermined time point according to the TWT synchronization information and arranging for the AP to transmit a next extended TWT response frame to the (N−M) STA(s) during a second TWT SP in order to request the (N−M) STA(s) to put the new TWT parameters into practice at the predetermined time point, and in a second circumstance when all of the N STA(s) successfully receive(s) the extended TWT response frame, making the N STA(s) put the new TWT parameters into practice at the predetermined time point according to the TWT synchronization information. The N is a first integer greater than one in the first circumstance or the N is a second integer greater than or equal to one in the second circumstance. In the first circumstance: the M is a positive integer smaller than the N; the predetermined time point is not earlier than the end of the second TWT SP; and the next extended TWT response frame carries the new TWT parameters and updated TWT synchronization information.

Another embodiment of the method of the present disclosure for setting a TWT to allow N STA(s) to wake up synchronously is performed by an AP. This embodiment includes the following step: transmitting an extended TWT response frame to the N STA(s) during a first TWT SP to request the N STA(s) to put new TWT parameters into practice at a predetermined time point, wherein the extended TWT response frame carries the new TWT parameters and TWT synchronization information including the predetermined time point. The N is an integer greater than or equal to one, the predetermined time point is not earlier than the end of a $K^{th}$ TWT SP, the $K^{th}$ TWT SP is later than the first TWT SP, and the K is an integer greater than one.

Another embodiment of the method of the present disclosure for setting a TWT to allow N STA(s) to wake up synchronously is performed by the N STA(s). This embodiment includes the following steps: making the N STA(s) execute a signal reception operation during a first TWT SP in order to receive an extended TWT response frame from an access point (AP), wherein the extended TWT response frame is a frame carrying new TWT parameters and TWT synchronization information; in a circumstance when all of the N STA(s) successfully receive(s) the extended TWT response frame during the first TWT SP, making the N STA(s) put the new TWT parameters into practice at a predetermined time point according to the TWT synchronization information; and in another circumstance when M STA(s) of the N STA(s) successfully receive(s) the extended TWT response frame during the first TWT SP and (N−M) STA(s) of the N STA(s) do(es) not successfully receive the extended TWT response frame during the first TWT SP, making the M STA(s) put the new TWT parameters into practice at the predetermined time point according to the TWT synchronization information and making the (N−M) STA(s) execute the signal reception operation during a second TWT SP in order to receive a next extended TWT response frame from the AP. The N is an integer greater than or equal to one in the circumstance, and in the another circumstance: the N is greater than one; the M is a positive integer smaller than the N; the predetermined time point is not earlier than the end of the second TWT SP; and the next extended TWT response frame carries the new TWT parameters and updated TWT synchronization information.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present specification discloses a method for setting a target wake time (TWT) to allow all station(s) (STA(s)) to wake up synchronously. The background knowledge of the TWT is found in the specification of IEEE 802.11-2020 or the specification of IEEE 802.11 AX.

Figure 1:
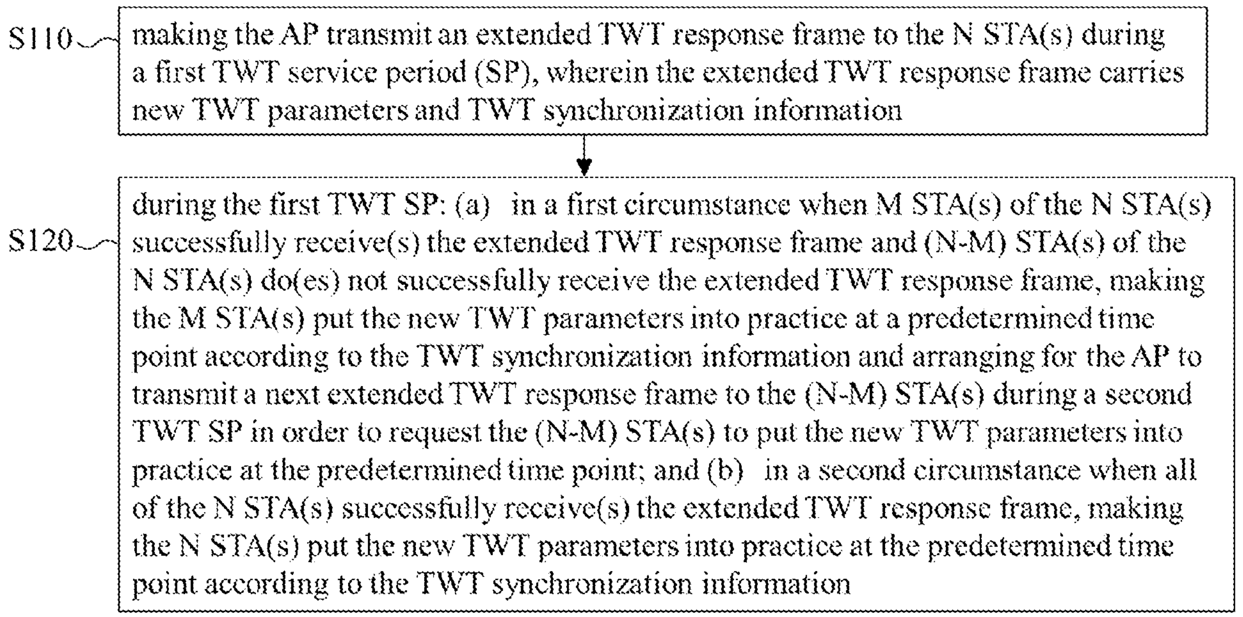
FIG. 1 shows an embodiment of the method of the present disclosure for setting a target wake time (TWT).

FIG. 1 shows an embodiment of the method of the present disclosure for setting a TWT. The embodiment of FIG. 1 is performed by an access point (AP) and N STA(s) jointly to allow the N STA(s) to wake up synchronously. The embodiment includes the following steps:

S110: making the AP transmit an extended TWT response frame to the N STA(s) during a first TWT service period (SP), wherein the extended TWT response frame carries new TWT parameters and TWT synchronization information.

It is noted that a TWT SP and a TWT response frame capable of carrying new TWT parameters are well-known in this technical field, and their detail fall beyond the present disclosure. As to the TWT synchronization information, its detail is described in later paragraphs.

S120: during the first TWT SP:

(a) in a first circumstance when M STA(s) of the N STA(s) successfully receive(s) the extended TWT response frame and (N−M) STA(s) of the N STA(s) do(es) not successfully receive the extended TWT response frame, making the M STA(s) put the new TWT parameters into practice at a predetermined time point according to the TWT synchronization information and arranging for the AP to transmit a next extended TWT response frame to the (N−M) STA(s) during a second TWT SP in order to request the (N−M) STA(s) to put the new TWT parameters into practice at the predetermined time point; and (b) in a second circumstance when all of the N STA(s) successfully receive(s) the extended TWT response frame, making the N STA(s) put the new TWT parameters into practice at the predetermined time point according to the TWT synchronization information.

It is noted that: the N is an integer greater than one in the first circumstance; or the N is an integer greater than or equal to one in the second circumstance.

In the first circumstance: the M is a positive integer smaller than the N; the predetermined time point is not earlier than the end of the second TWT SP; and the next extended TWT response frame carries the new TWT parameters and updated TWT synchronization information to specifically describe the predetermined time point. When the (N−M) STA(s) successfully receive(s) the next extended TWT response frame during the second TWT SP, all the N STAs apply the new TWT parameters at the predetermined time point to wake up synchronously. In consideration of that the N STAs wake up synchronously, the present embodiment can further make the AP to serve the N STAs simultaneously with Orthogonal Frequency-Division Multiple Access (OFDMA) or other known/self-developed techniques to improve the whole service efficiency without sacrificing the power consumption performance of the N STAs.

Figure 2A:
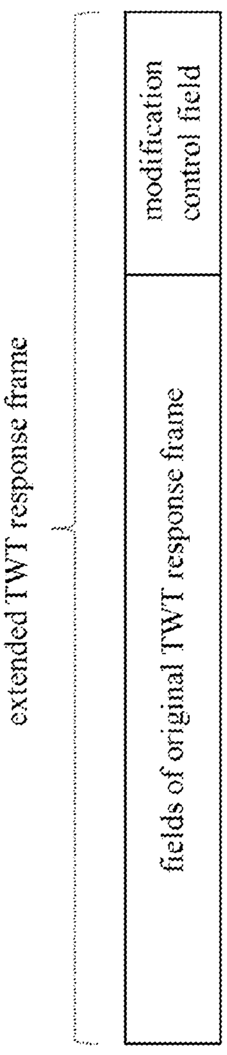
FIG. 2*a* shows an embodiment of the extended TWT response frame of FIG. 1.
Figure 2B:
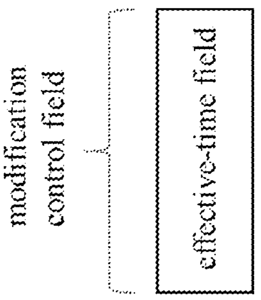
FIG. 2*b* shows an embodiment of the modification control field of FIG. 2*a*.
Figure 2C:
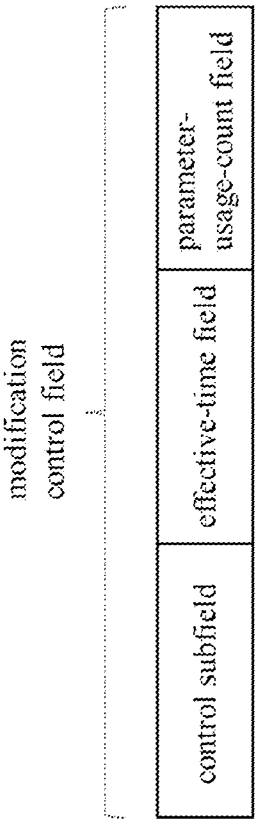
FIG. 2*c* shows another embodiment of the modification control field of FIG. 2*a*.

FIG. 2*a* shows an embodiment of the extended TWT response frame. As shown in FIG. 2*a*, in addition to the fields of an original TWT response frame, the extended TWT response frame further includes a modification control field for carrying the TWT synchronization information. FIG. 2*b* shows an embodiment of the modification control field including an effective-time field used for indicating to the N STA(s) when to apply the new TWT parameters; however, as mentioned in the preceding paragraphs, in the first circumstance the (N−M) STA(s) do(es) not successfully receive this indication. FIG. 2*c* shows another embodiment of the modification control field further including: a control subfield; and a parameter-usage-count field. The control subfield is used for advanced setting, and the parameter-usage-count field is used for indicating to the N STA(s) that the new TWT parameters should take effect continuously or should take effect for predetermined times; and it is noted that in the first circumstance the (N−M) STA(s) do(es) not successfully receive the above-mentioned indication.

Figure 2D:
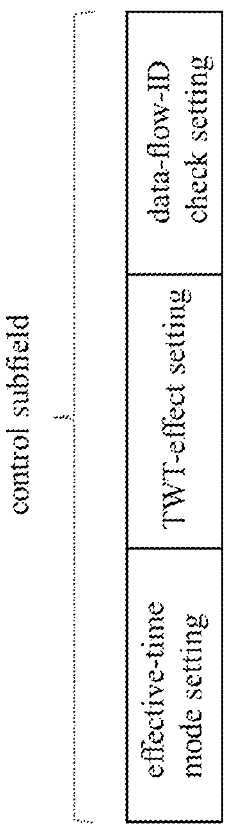
FIG. 2*d* shows an embodiment of a control subfield of FIG. 2*c*.

FIG. 2*d* shows an embodiment of the control subfield. As shown in FIG. 2*d*, the control subfield includes at least one of the following: a field for effective-time mode setting; a field for TWT-effect setting; and a field for data-flow-identification check setting. The effective-time mode setting is used for requesting the M STA(s) to operate in one of a countdown mode and a time-synchronization-function mode. The TWT-effect setting is used for indicating whether a TWT field of the extended TWT response frame should take effect, and thereby making the M STA(s) ignore the TWT field when the TWT field should not take effect or making the M STA(s) treat the TWT field as a part of the new TWT parameters when the TWT field should take effect. The data-flow-identification check setting is used in the countdown mode for requesting the M STA(s) to count down to a countdown value (mentioned in later paragraphs) of a TWT agreement which conforms to a specific data-flow-identification.

Figure 3:
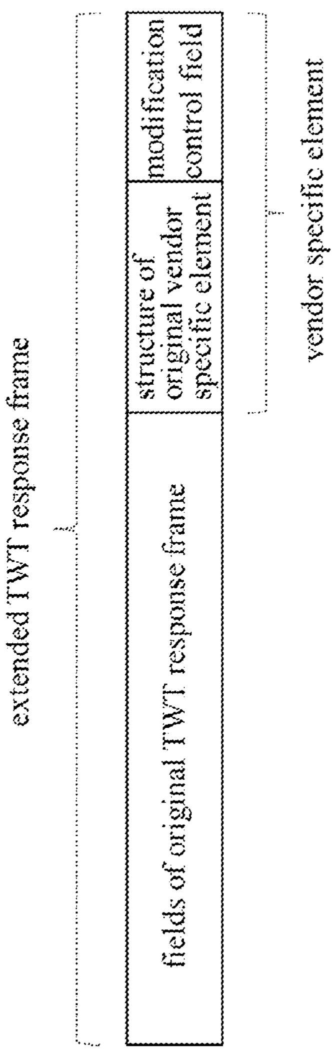
FIG. 3 shows another embodiment of the extended TWT response frame of FIG. 1.

It is noted that the length of each of the aforementioned fields can conform to regular requirements or be determined according to implementation needs. Furthermore, in order to notify the N STA(s) that the extended TWT response frame includes the modification control field, the embodiment of FIG. 1 can further include the following step: making the AP fill in a reserved field in the fields of original TWT response frame of the extended TWT response frame with a predetermined value to indicate that the extended TWT response frame additionally includes the modification control field. Moreover, the embodiment of FIG. 1 may carry the TWT synchronization information in other known/self-developed manners. For example, the embodiment of FIG. 1 includes the following step: making the AP generate the extended TWT response frame including a vendor specific element as shown in FIG. 3, wherein the vendor specific element includes the structure of an original vendor specific element and further includes a modification control field for carrying the TWT synchronization information.

Figure 4:
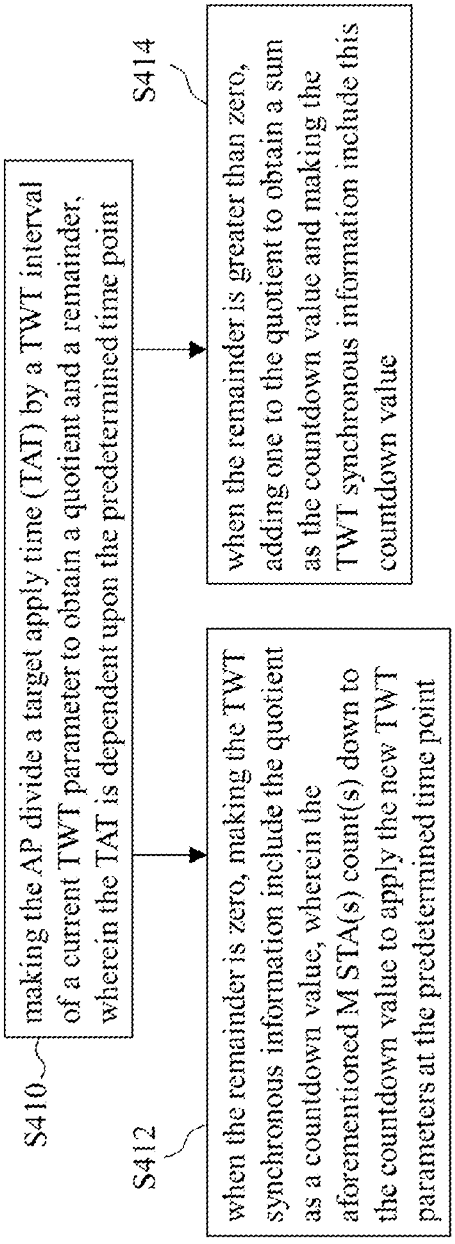
FIG. 4 shows supplemental steps to the embodiment of FIG. 1 when the embodiment is in a countdown mode.

In an exemplary implementation of the embodiment of FIG. 1, the TWT synchronization information is for requesting the M STA(s) to operate in a countdown mode, the predetermined time point is the end of a $K^{th}$ TWT SP or the start of a $(K+1)^{th}$ TWT SP, and the K is an integer greater than one. More specifically, each of the AP and the N STA(s) has a time synchronization function (TSF) timer to synchronize the AP with the N STA(s), and the embodiment of FIG. 1 further includes the following steps (as shown in FIG. 4):

S410: making the AP divide a target apply time (TAT) by a TWT interval of a current TWT parameter to obtain a quotient and a remainder, wherein the TAT is dependent upon the predetermined time point.
It is noted that since the AP is synchronized with the N STA(s), their TATs are synchronous.

S412: when the remainder is zero, making the TWT synchronous information include the quotient as a countdown value, wherein the aforementioned M STA (s) count(s) down to the countdown value to apply the new TWT parameters at the predetermined time point. For example: each of the M STA(s) updates the countdown value by subtracting one from the current countdown value at the end of each TWT SP; and when the countdown value is decreased to zero, the M STA(s) put(s) the new TWT parameters into practice.

S414: when the remainder is greater than zero, adding one to the quotient to obtain a sum as the countdown value and making the TWT synchronous information include this countdown value.

By means of the above manner, the predetermined time is the end of the $K^{th}$ TWT SP or the start of the $(K+1)^{th}$ TWT SP, wherein the K is the initial value of the countdown value.

Figure 5:
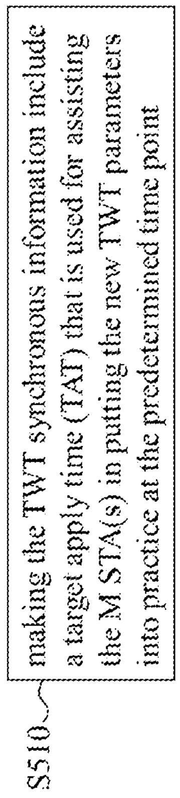
FIG. 5 shows supplemental steps to the embodiment of FIG. 1 when the embodiment is in a time-synchronization-function mode.

In an exemplary implementation of the embodiment of FIG. 1, the TWT synchronization information is for requesting the M STA(s) to operate in a time-synchronization-function mode, and the predetermined time point is an appointed time that is not restricted to the end time or the start time of any TWT SP. In detail, each of the AP and the N STA(s) has a TSF timer to synchronize the AP with the N STA(s), and the embodiment of FIG. 1 further includes the following step (as shown in FIG. 5):

S510: making the TWT synchronous information include a target apply time (TAT) that is used for assisting the M STA(s) in putting the new TWT parameters into practice at the predetermined time point.

By means of the above manner, the predetermined time point is the TAT.

Figure 6:
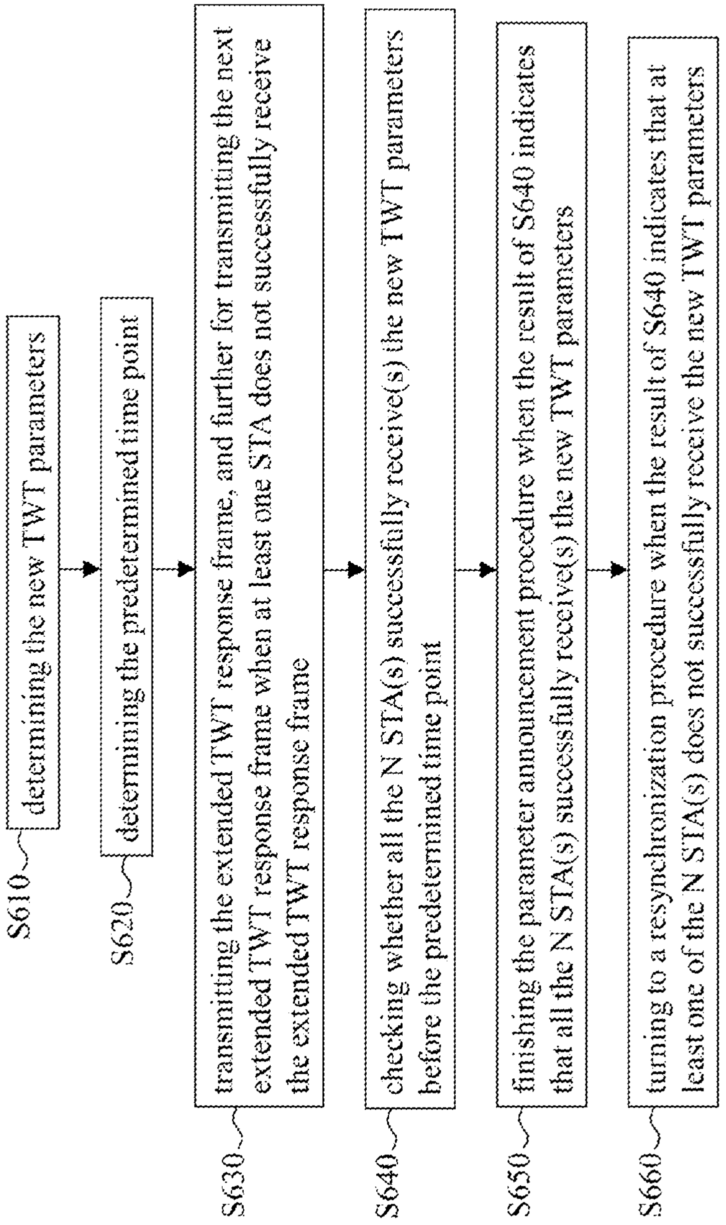
FIG. 6 shows an embodiment of the access point (AP) of FIG. 1 executing a parameter announcement procedure.

FIG. 6 shows an embodiment of the AP transmitting the extended TWT response frame. This embodiment illustrates how the AP executes a parameter announcement procedure to transmit the extended TWT response frame and the next extended TWT response frame. In detail, the parameter announcement procedure includes the following steps:

S610: a parameter determination step for determining the new TWT parameters;

S620: a time-point determination step for determining the predetermined time point;

S630: an extended TWT response frame transmission step for transmitting the extended TWT response frame, and further for transmitting the next extended TWT response frame when at least one STA (i.e., the aforementioned (N−M) STA(s)) does not successfully receive the extended TWT response frame;

S640: a decision step for checking whether all the N STA(s) successfully receive(s) the new TWT parameters before the predetermined time point;

S650: an ending step for finishing the parameter announcement procedure when the result of the decision step indicates that all the N STA(s) successfully receive(s) the new TWT parameters; and

S660: a transition step for turning to a resynchronization procedure when the result of the decision step indicates that at least one of the N STA(s) does not successfully receive the new TWT parameters.

Figure 7:
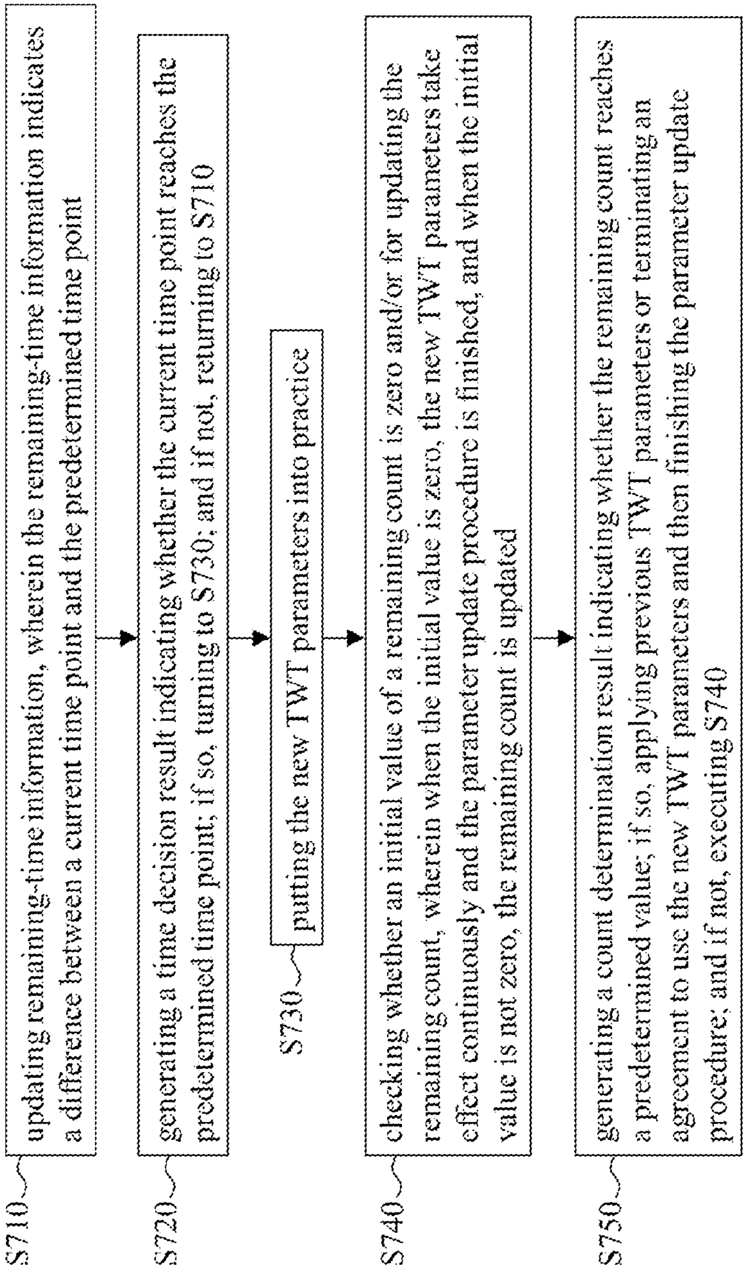
FIG. 7 shows the AP and the station(s) (STA(s)) of FIG. 1 executing a parameter update procedure.

FIG. 7 shows an embodiment of the AP and the M STA(s) applying the new TWT parameters. This embodiment illustrates how each of the AP and the M STA(s) executes a parameter update procedure according to the new TWT parameters and the TWT synchronous information to determine when to put the new TWT parameters into practice. In detail, the parameter update procedure includes the following steps:

S710: an effective-time update step for updating remaining-time information, wherein the remaining-time information indicates a difference between a current time point and the predetermined time point;

S720: a time decision step for generating a time decision result indicating whether the current time point reaches (equals or exceeds) the predetermined time point, the time decision step further for turning to the step S730 when the time decision result indicates that the current time point reaches the predetermined time point, and the time decision step further for returning to the step S710 when the time decision result indicates that the current time point does not reach the predetermined time point;

S730: a new-parameter application step for putting the new TWT parameters into practice;

S740: a parameter-usage-count update step for checking whether an initial value of a remaining count is zero and/or for updating the remaining count, wherein when the initial value is zero, the new TWT parameters take effect continuously and the parameter update procedure is finished, and when the initial value is not zero, the remaining count is updated; and

S750: a count determination step for generating a count determination result indicating whether the remaining count reaches a predetermined value, wherein when the count determination result indicates that the count determination result reaches the predetermined value, previous TWT parameters are put into practice or an agreement to use the new TWT parameters is terminated and then the parameter update procedure is finished; and when the count determination result indicates that the count determination result does not reach the predetermined value, the step S740 is executed.

It is noted that when any of the other STA(s) (i.e., the aforementioned (N−M) STA(s)) successfully receives any extended TWT response frame, this STA should execute the parameter update procedure according to the new TWT parameters and the updated TWT synchronous information of the received extended TWT response frame.

Figure 8:
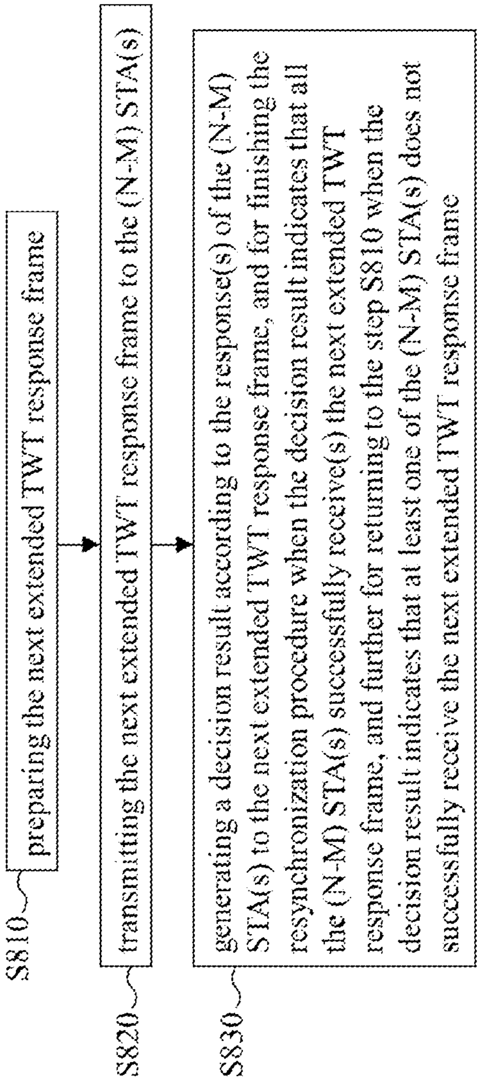
FIG. 8 shows an embodiment of the AP of FIG. 1 executing a resynchronization procedure.

FIG. 8 shows an embodiment of the resynchronization procedure mentioned in the step S660 of FIG. 6. This embodiment is performed by the AP for synchronizing the (N−M) STA(s) that are not synchronized yet. In detail, the resynchronization procedure includes the following steps:

S810: a frame preparation step for preparing the next extended TWT response frame;

S820: a frame transmission step for transmitting the next extended TWT response frame to the (N−M) STA(s); and S830: a decision step for generating a decision result according to the response(s) of the (N−M) STA(s) to the next extended TWT response frame, and for finishing the resynchronization procedure when the decision result indicates that all the (N−M) STA(s) successfully receive(s) the next extended TWT response frame, and further for returning to the step S810 when the decision result indicates that at least one of the (N−M) STA(s) does not successfully receive the next extended TWT response frame.

It is noted that in order to prevent some STA(s) from taking too much time for synchronization, the embodiment of FIG. 8 may further include: when the AP does not receive any response from X STA(s) for one or more times, disconnecting the AP from the X STA(s), wherein the X is a positive integer not greater than (N−M). It is also noted that the AP can try to resynchronize the X STA(s) after the implementation of the embodiment of FIG. 8.

Figure 9:
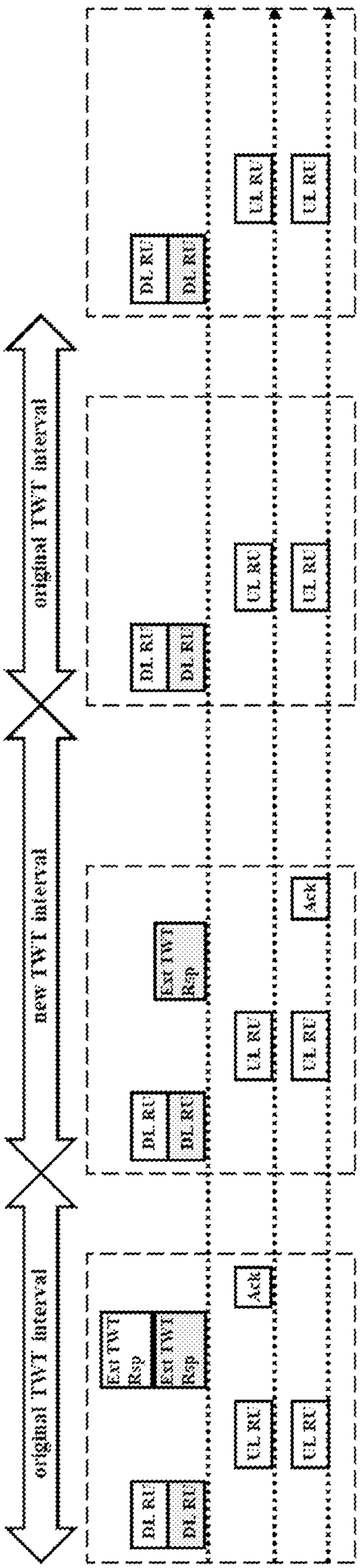
FIG. 9 shows an exemplary implementation of the embodiment of FIG. 1.
Figure 10:
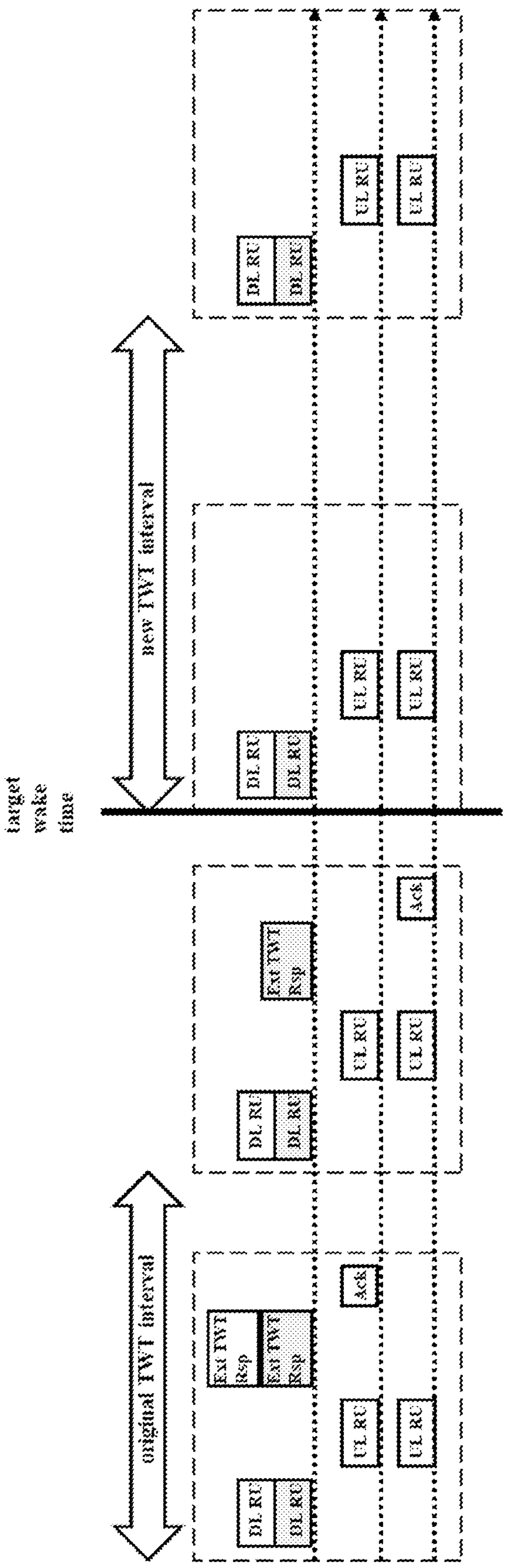
FIG. 10 shows another exemplary implementation of the embodiment of FIG. 1.
Figure 11:
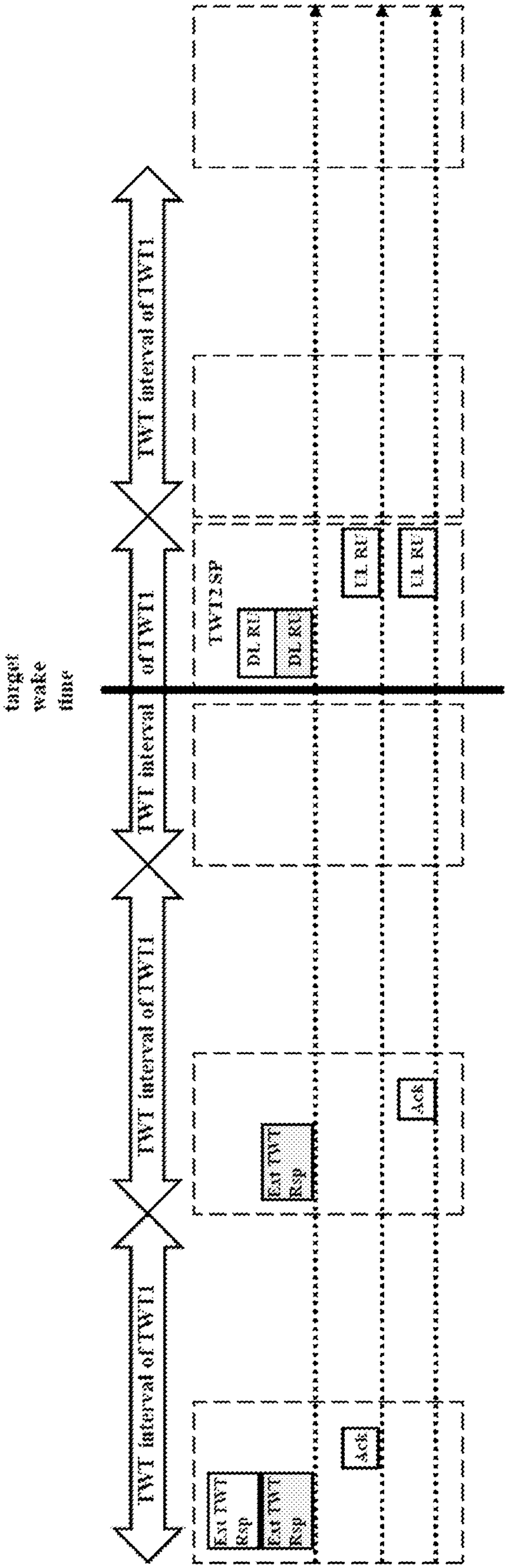
FIG. 11 shows yet another exemplary implementation of the embodiment of FIG. 1.

Several exemplary implementations are illustrated with FIGS. 9~11 for a better understanding of the present invention. In FIGS. 9~11, each dashed frame stands for a TWT SP; each arrow-headed dotted line stands for a timeline, and the top timeline, the middle timeline, and the bottom timeline in the figures are corresponding to the timeline of the AP, the timeline of STA1, and the timeline of STA2 respectively; each label "DL RU" stands for a downlink resource unit frame exchange; each label "UL RU" stands for an uplink resource unit frame exchange; each label "Ext TWT Rsp" stands for an extended TWT response frame; and each label "Ack" stands for an acknowledgement. In regard to the signals from the AP, each of these signals on a white ground is for STA1 and each of these signals on a gray ground is for STA2. It is noted that: the downlink RU frame exchange includes Downlink Resource Unit from AP and Ack from STA1 and STA2; the uplink RU frame exchange includes Basic Trigger Frame from AP, and Uplink Resource Unit from STAs, and Multi-STA Block Ack from AP. The illustrations of DL RU and UL RU are simplified for better expression.

In regard to a first exemplary implementation: an AP reaches a TWT agreement including parameters with a first STA (STA1) and reaches another TWT agreement including the same parameters with a second STA (STA2) so that the AP can serve the two STAs within the same TWT SP and transmit data in the manner of OFDMA. Provided that the AP does not plan to transmit data to STA1 and STA2 in a next period of time, the AP decides to extend a TWT interval after the following two TWT SPs to let STA1 and STA2 stay in a sleep mode for a longer time to save power. In this case, the AP generates an extended TWT response frame to indicate: applying a countdown mode; setting a countdown value to two (which implies that new TWT parameters will be applied after the following two TWT SPs); setting a parameter-usage-count to one (which implies that the new TWT parameters will only be applied once) or a prescribed value; setting a parameter of TWT-effect setting to zero; and setting a parameter of data-flow-identification setting to the data flow identification of the TWT agreement; and setting the TWT interval of the extended TWT response frame to a longer value. Based on the above, in a scenario as shown in FIG. 9:

(1) The AP transmits the extended TWT response frame to STA1 and STA2 within a first TWT SP;

(2) Only STA1 successfully receives the extended TWT response frame and replies to the AP with an acknowledgement (Ack), and then STA1 determines when to apply new TWT parameters according to the content of the extended TWT response frame;

(3) After the transmission of the extended TWT response frame, the remaining time of the first TWT SP is not enough for the AP to retransmit the extended TWT response frame to STA2; therefore, the AP waits for the start of a second TWT SP to transmit a next extended TWT response frame to STA2.

In the above scenario, at the end of the first TWT SP, each of the AP and STA1 decreases the countdown value by one (i.e., 2−1=1). Since the updated countdown value (i.e., 1) is still greater than zero, the AP and STA1 keep using the original TWT parameters (including original TWT interval) to set the start time of the second TWT SP. During the second TWT SP, the AP transmits the next extended TWT response frame to STA2. Since the countdown value is updated to one at the end of the first TWT SP, the countdown value included in the next extended TWT response frame should be one. After STA2 successfully receives the next extended TWT response frame, each of the AP, STA1, and STA2 decreases the countdown value by one (i.e., 1−1=0) at the end of the second TWT SP; afterwards, since the countdown value is updated to zero, the AP, STA1, and STA2 apply the new TWT parameters (including new TWT interval) synchronously so that the next TWT SP (i.e., the third TWT SP) will start after the new TWT interval which is longer than the original TWT interval. In addition, since the initial value of the parameter-usage-count is not zero (or the prescribed value), at the end of the third TWT SP the AP, STA1, and STA2 will apply the original TWT parameters, which implies that the AP, STA1, and STA2 will store the original TWT parameters for subsequent use. At the end of the third TWT SP, each of the AP, STA1, and STA2 decreases the parameter-usage-count by one (i.e., 1−1=0); afterwards, since the parameter-usage-count is updated to zero, the AP, STA1, and STA2 put the original TWT parameters into practice again, which implies that the next TWT SP (i.e., the fourth TWT SP) will start after the original TWT interval.

In regard to a second exemplary implementation: provided the AP detects the change of data characteristics and plans to request STA1 and STA2 to be aligned with a specific time point (e.g., a time point at which a video packet is generated), the AP decides to apply new TWT parameters (including new TWT interval) continuously after the following two TWT SPs and start a subsequent TWT SP at the specific time point. In this case, the AP generates an extended TWT response frame to indicate: applying a countdown mode; setting a countdown value to two (which implies that new TWT parameters will be applied after the following two TWT SPs); setting a parameter-usage-count to zero (which implies that the new TWT parameters will be applied continuously) or a prescribed value; setting a parameter of TWT-effect setting to one; setting a TWT interval to make it suitable for the above-mentioned alignment; and making a target wake time (i.e., the value of the aforementioned TWT field) be an appointed time point (as indicated by the bold black vertical line in FIG. 10). Based on the above, in a scenario as shown in FIG. 10:

(1) The AP transmits the extended TWT response frame to STA1 and STA2 within a first TWT SP;

(2) Only STA1 successfully receives the extended TWT response frame and replies to the AP with an Ack, and then STA1 determines when to apply the new TWT parameters according to the content of the extended TWT response frame;

(3) The AP waits for the start of a second TWT SP to transmit a next extended TWT response frame to STA2.

In the above scenario, at the end of the first TWT SP, each of the AP and STA1 decreases the countdown value by one (i.e., 2−1=1). Since the updated countdown value (i.e., 1) is still greater than zero, the AP and STA1 keep using the original TWT parameters to set the start time of the second TWT SP. During the second TWT SP, the AP transmits the next extended TWT response frame to STA2. Since the countdown value is updated to one at the end of the first TWT SP, the countdown value included in the next extended TWT response frame should be one. After STA2 successfully receives the next extended TWT response frame, each of the AP, STA1, and STA2 decreases the countdown value by one (i.e., 1−1=0) at the end of the second TWT SP; afterwards, since the countdown value is updated to zero, the AP, STA1, and STA2 apply the new TWT parameters (including the above-mentioned target wake time) to set the start time of the subsequent TWT SP (i.e., the third TWT SP). Since the parameter of the TWT-effect setting is one, the start time of the third TWT SP is the target wake time. Furthermore, since the initial value of the parameter-usage-count is zero (or the prescribed value), the AP, STA1, and STA2 will use the new TWT parameters continuously without retaining the original TWT parameters.

In regard to a third exemplary implementation: provided the AP, STA1, and STA2 has jointly established a TWT agreement (TWT1) with a data flow identification being one (hereinafter referred to as "Flow ID(1)") and the AP plans to transmit additional information (e.g., channel state information (CSI)) to STA1 and STA2. In this case, the AP generates an extended TWT response frame to indicate: setting a countdown value to three; setting a parameter of TWT-effect setting to one; setting a target wake time (i.e., the value of the aforementioned TWT field) to an appointed time point (as indicated by the bold black vertical line in FIG. 11); setting a check flow ID (hereinafter referred to as "Check Flow ID") to one; setting the flow identification of the transmission of the additional information to two; and setting a parameter-usage-count to one. Based on the above, in a scenario as shown in FIG. 11:

(1) The AP transmits the extended TWT response frame to STA1 and STA2 within a first TWT SP;

(2) Only STA1 successfully receives the extended TWT response frame during the first TWT SP and replies to the AP with an Ack; at the end of the first TWT SP, STA1 detects that the Check Flow ID is the same as the Flow ID(1) of the TWT agreement (TWT1) and thus each of the AP and STA1 decreases the countdown value by one (i.e., 3−1=2);

(3) During a second TWT SP, STA2 successfully receives the next extended TWT response (including an updated countdown value being two) and replies to the AP with an Ack; at the end of the second TWT SP, each of the AP, STA1, and STA2 decreases its countdown value by one (i.e., 2−1=1);

(4) When a third TWT SP finishes, each of the AP, STA1, and STA2 decreases its countdown value by one (i.e., 1−1=0); afterwards, since the countdown value reaches zero, the AP, STA1, and STA2 apply new TWT parameters; in consideration of that a TWT agreement with a flow identification being two (hereinafter referred to as "Flow ID(2)") has not been established, the AP, STA1, and STA2 jointly establish a TWT agreement (TWT2) with the Flow ID(2) according the new TWT parameters and start a new TWT SP (i.e., the TWT2 SP in FIG. 11) at the appointed time point (as indicated by the bold black vertical line in FIG. 11) to transmit the addition information.

When the new TWT SP finishes, the parameter-usage-count is decreased to zero, and the AP, STA1, and STA2 are supposed to restore the parameters of the TWT agreement (TWT2) to the original parameters of the TWT agreement (TWT2); however, such original parameters do not exist, and thus the AP, STA1, and STA2 terminate the TWT agreement (TWT2).

Figure 12:
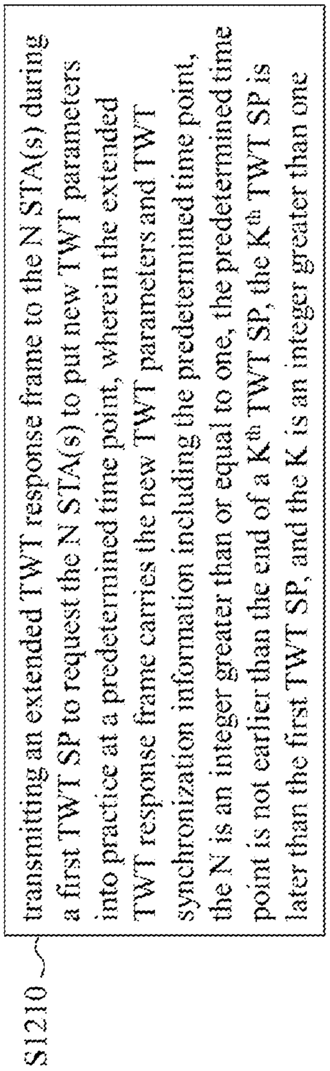
FIG. 12 shows another embodiment of the method of the present disclosure for setting a TWT.

FIG. 12 shows another embodiment of the method of the present disclosure for setting a TWT. The embodiment of FIG. 12 is performed by an AP to allow N STA(s) to wake up synchronously. This embodiment includes the following step:

S1210: transmitting an extended TWT response frame to the N STA(s) during a first TWT SP to request the N STA(s) to put new TWT parameters into practice at a predetermined time point, wherein the extended TWT response frame carries the new TWT parameters and TWT synchronization information including the predetermined time point. The Nis an integer greater than or equal to one, the predetermined time point is not earlier than the end of a $K^{th}$ TWT SP, the $K^{th}$ TWT SP is later than the first TWT SP, and the K is an integer greater than one.

Since those having ordinary skill in the art can refer to the embodiments of FIGS. 1~11 to appreciate the detail and the modification of the embodiment of FIG. 12, repeated and redundant description is omitted here.

Figure 13:
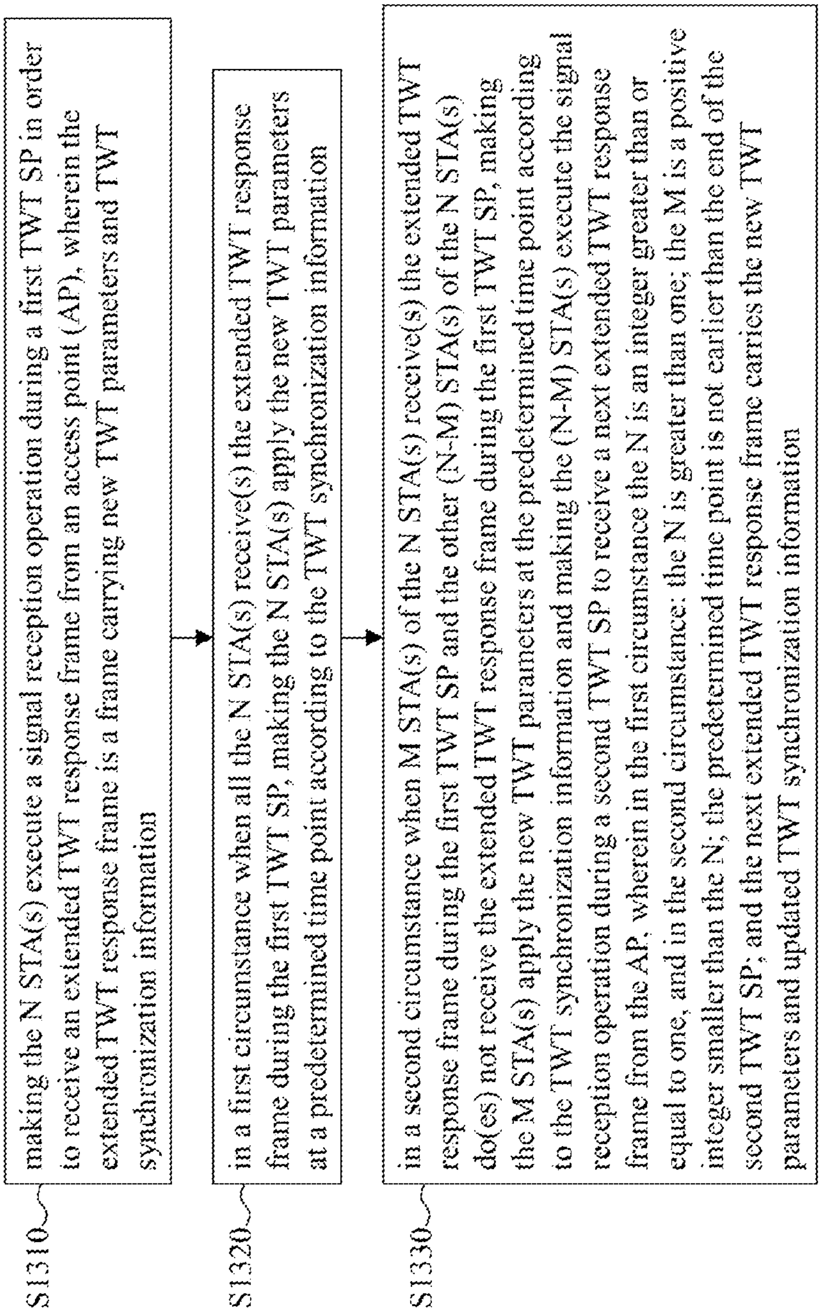
FIG. 13 shows yet another embodiment of the method of the present disclosure for setting a TWT.

FIG. 13 shows another embodiment of the method of the present disclosure for setting a TWT. The embodiment of FIG. 13 is performed by N STA(s) to allow the N STA(s) to wake up synchronously. This embodiment includes the following steps:

S1310: making the N STA(s) execute a known/self-developed signal reception operation during a first TWT SP in order to receive an extended TWT response frame from an access point (AP), wherein the extended TWT response frame is a frame carrying new TWT parameters and TWT synchronization information;

S1320: in a first circumstance when all of the N STA(s) successfully receive(s) the extended TWT response frame during the first TWT SP, making the N STA(s) put the new TWT parameters into practice at a predetermined time point according to the TWT synchronization information; and S1330: in a second circumstance when M STA(s) of the N STA(s) successfully receive(s) the extended TWT response frame during the first TWT SP and the other (N−M) STA(s) of the N STA(s) do(es) not successfully receive the extended TWT response frame during the first TWT SP, making the M STA(s) put the new TWT parameters into practice at the predetermined time point according to the TWT synchronization information and making the (N−M) STA(s) execute the signal reception operation during a second TWT SP in order to receive a next extended TWT response frame from the AP.

It is noted that in the first circumstance the N is an integer greater than or equal to one, and in the second circumstance: the N is greater than one; the M is a positive integer smaller than the N; the predetermined time point is not earlier than the end of the second TWT SP; and the next extended TWT response frame carries the new TWT parameters and updated TWT synchronization information.

Since those having ordinary skill in the art can refer to the embodiments of FIGS. 1~11 to appreciate the detail and the modification of the embodiment of FIG. 13, repeated and redundant description is omitted here.

It is noted that people having ordinary skill in the art can selectively use some or all of the features of any embodiment in this specification or selectively use some or all of the features of multiple embodiments in this specification to implement the present invention as long as such implementation is practicable; in other words, the way to implement the present invention is flexible based on the present disclosure.

To sum up, the method of the present disclosure for setting a TWT allows multiple STAs to wake up synchronously and thereby allows an AP to serve the multiple STAs simultaneously with OFDMA to improve the whole operation efficiency.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A method for setting a target wake time (TWT) to allow N station(s) to wake up synchronously, the method being performed by an access point (AP) and the N station(s) jointly and comprising:

making the AP transmit an extended TWT response frame to the N station(s) during a first TWT service period (SP), wherein the extended TWT response frame carries new TWT parameters and TWT synchronization information;

during the first TWT SP:

in a first circumstance in response to M station(s) of the N station(s) successfully receiving the extended TWT response frame and (N−M) station(s) of the N station(s) not successfully receiving the extended TWT response frame, making the M station(s) put the new TWT parameters into practice at a predetermined time point according to the TWT synchronization information and arranging for the AP to transmit a next extended TWT response frame to the (N−M) station(s) during a second TWT SP in order to request the (N−M) station(s) to put the new TWT parameters into practice at the predetermined time point; and in a second circumstance in response to all of the N station(s) successfully receiving the extended TWT response frame, making the N station(s) put the new TWT parameters into practice at the predetermined time point according to the TWT synchronization information, wherein the N is a first integer greater than one in the first circumstance or the N is a second integer greater than or equal to one in the second circumstance, and in the first circumstance: the M is a positive integer smaller than the N; the predetermined time point is not earlier than an end time of the second TWT SP; and the next extended TWT response frame carries the new TWT parameters and updated TWT synchronization information.

2. The method of claim 1, wherein the method allows the N station(s) to wake up synchronously and makes the AP serve the N station(s) simultaneously with Orthogonal Frequency-Division Multiple Access.

3. The method of claim 1, wherein the TWT synchronization information is for requesting the M station(s) to operate in a countdown mode, the predetermined time point is an end time of a $K^{th}$ TWT SP or a start time of a (K+1)th TWT SP, and the K is an integer greater than one.

4. The method of claim 1, wherein the TWT synchronization information is for requesting the M station(s) to operate in a time-synchronization-function mode, and the predetermined time point is an appointed time that is not restricted to an end time or a start time of any TWT SP.

5. The method of claim 1, further comprising: making the AP generate the extended TWT response frame including a modification control field, wherein the modification control field is for carrying the TWT synchronization information.

6. The method of claim 1, further comprising: making the AP generate the extended TWT response frame including a vendor specific element, wherein the vendor specific element includes a modification control field for carrying the TWT synchronization information.

7. The method of claim 1, further comprising: making the AP execute a parameter announcement procedure to transmit the extended TWT response frame, wherein the parameter announcement procedure includes:

a parameter determination step for determining the new TWT parameters;

a time-point determination step for determining the predetermined time point;

an extended TWT response frame transmission step for transmitting the extended TWT response frame, and further for transmitting the next extended TWT response frame when the (N−M) station(s) do(es) not successfully receive the extended TWT response frame;

a decision step for checking whether all of the N station(s) receive(s) the new TWT parameters before the predetermined time point;

an ending step for finishing the parameter announcement procedure when the decision step indicates that all of the N station(s) successfully receive(s) the new TWT parameters; and a transition step for turning to a resynchronization procedure when the decision step indicates that at least one of the N station(s) does not successfully receive the new TWT parameters.

8. The method of claim 1, further comprising: making the AP and each of the M station(s) execute a parameter update procedure to determine when to put the new TWT parameters into practice, wherein the parameter update procedure includes:

an effective-time update step for updating remaining-time information, wherein the remaining-time information indicates a difference between a current time point and the predetermined time point;

a time decision step for generating a time decision result showing whether the current time point reaches the predetermined time point, the time decision step further for turning to a new-parameter application step when the time decision result shows the current time point reaches the predetermined time point, and the time decision step further for returning to the effective-time update step when the time decision result shows the current time point does not reach the predetermined time point;

the new-parameter application step for putting the new TWT parameters into practice;

a parameter-usage-count update step for checking whether an initial value of a remaining count is zero and/or for updating the remaining count, wherein when the initial value is zero, the new TWT parameters take effect and the parameter update procedure is finished, and when the initial value is not zero, the remaining count is updated; and a count determination step for generating a count determination result showing whether the remaining count reaches a predetermined value, wherein when the count determination result shows the count determination result reaches the predetermined value, old TWT parameters are put into practice or an agreement to use the new TWT parameters is terminated and then the parameter update procedure is finished; and when the count determination result shows the count determination result does not reach the predetermined value, the parameter-usage-count update step is executed.

9. The method of claim 1, further comprising: in the first circumstance making the AP execute a resynchronization procedure to make the (N−M) station(s) wake up synchronously, wherein the resynchronization procedure includes:

a frame preparation step for preparing the next extended TWT response frame;

a frame transmission step for transmitting the next extended TWT response frame to the (N−M) station(s); and a decision step for generating a decision result according to (N−M) responses of the (N−M) station(s) to the next extended TWT response frame, finishing the resynchronization procedure when the decision result indicates that all of the (N−M) station(s) receive(s) the next extended TWT response frame, and returning to the frame preparation step when the decision result indicates that at least one of the (N−M) station(s) does not receive the next extended TWT response frame.

10. A method for setting a target wake time (TWT) to allow N station(s) to wake up synchronously, the method being performed by an access point (AP) and comprising:

transmitting an extended TWT response frame to the N station(s) during a first TWT service period (SP) to request the N station(s) to put new TWT parameters into practice at a predetermined time point, wherein the extended TWT response frame carries the new TWT parameters and TWT synchronization information including the predetermined time point, wherein the N is an integer greater than or equal to one, the predetermined time point is not earlier than an end time of a $K^{th}$ TWT SP, the $K^{th}$ TWT SP is later than the first TWT SP, and the K is an integer greater than one.

11. The method of claim 10, further comprising:

in response to M station(s) of the N station(s) successfully receiving the extended TWT response frame and (N−M) station(s) of the N station(s) not successfully receiving the extended TWT response frame, making the AP transmit a next extended TWT response frame to the (N−M) station(s) during a second TWT SP to request the (N−M) station(s) to put the new TWT parameters into practice at the predetermined time point, wherein the M is an integer not smaller than zero and not greater than the N, and the next extended TWT response frame carries the new TWT parameters and updated TWT synchronization information.

12. A method for setting a target wake time (TWT) to allow N station(s) to wake up synchronously, the method being performed by the N station(s) and comprising:

making the N station(s) execute a signal reception operation during a first TWT service period (SP) in order to receive an extended TWT response frame from an access point (AP), wherein the extended TWT response frame carries new TWT parameters and TWT synchronization information;

in a circumstance in response to all of the N station(s) successfully receiving the extended TWT response frame during the first TWT SP, making the N station(s) put the new TWT parameters into practice at a predetermined time point according to the TWT synchronization information; and in another circumstance in response to M station(s) of the N station(s) successfully receiving the extended TWT response frame during the first TWT SP and (N−M) station(s) of the N station(s) [do(es)] not successfully receiving the extended TWT response frame during the first TWT SP, making the M station(s) put the new TWT parameters into practice at the predetermined time point according to the TWT synchronization information and making the (N−M) station(s) execute the signal reception operation during a second TWT SP in order to receive a next extended TWT response frame from the AP, wherein the N is an integer greater than or equal to one in the circumstance, and in the another circumstance: the N is greater than one; the M is a positive integer smaller than the N; the predetermined time point is not earlier than an end time of the second TWT SP; and the next extended TWT response frame carries the new TWT parameters and updated TWT synchronization information.

* * * * *